United States Patent [19]

Zeller et al.

[11] 4,425,317

[45] Jan. 10, 1984

[54] RECYCLE OF HYDROGENATED SULFUR PLANT TAIL GAS TO SOUR GAS SCRUBBING SYSTEM

[75] Inventors: Rainer Zeller, Gruenwald; Aldo Belloni, Puchheim; Michael Heisel, Munich, all of Fed. Rep. of Germany

[73] Assignee: Linde Aktiengesellschaft, Wiesbaden, Fed. Rep. of Germany

[21] Appl. No.: 328,554

[22] Filed: Dec. 8, 1981

[30] Foreign Application Priority Data

Dec. 18, 1980 [DE] Fed. Rep. of Germany ....... 3047830

[51] Int. Cl.$^3$ ............................................. C01B 17/00
[52] U.S. Cl. ............................... 423/574 R; 423/226; 423/573 R; 55/68; 55/73
[58] Field of Search ............................... 423/226–229, 423/573, 574; 55/73, 42, 53, 68, 89, 93, 94

[56] References Cited

U.S. PATENT DOCUMENTS

| | | | |
|---|---|---|---|
| 3,710,546 | 1/1973 | Grünewald et al. | 55/42 |
| 4,001,386 | 1/1977 | Klein et al. | 423/573 |
| 4,080,424 | 3/1978 | Miller et al. | 55/73 X |
| 4,085,199 | 4/1978 | Singleton et al. | 423/574 R |
| 4,254,094 | 3/1981 | Hegarty | 423/220 |

OTHER PUBLICATIONS

Ranke, Gerhard, "Advantages of the Rectisol-Wash Process in Selective H$_2$S Removal from Gas Mictures", *Linde Reports on Science and Technology*, 18/1973, pp. 7–13.

*Primary Examiner*—Earl C. Thomas
*Attorney, Agent, or Firm*—Millen & White

[57] ABSTRACT

In a process for the separation of at least carbon dioxide and hydrogen sulfide from a raw gaseous mixture to form a purified gaseous mixture comprising passing said gas through a sour gas removal system including the steps of scrubbing said gaseous mixture with a liquid scrubbing agent having a higher affinity for hydrogen sulfide than for carbon dioxide, removing from said system an off-gas enriched in hydrogen sulfide, and passing said off-gas to a sulfur recovery system comprising the conversion of sulfur values to elemental sulfur and the recovery of a tail gas containing hydrogen sulfide and sulfur dioxide, the improvement which comprises hydrogenating said tail gas to convert sulfur dioxide to hydrogen sulfide and recycling resultant hydrogenated tail gas to said sour gas removal system, whereby essentially no hydrogen sulfide or sulfur dioxide is discharged into the environment.

12 Claims, 3 Drawing Figures ary sulfur in a sulfur producing plant, e.g., a Claus plant. Because the ecologically harmless carbon dioxide exhibits no significant, beneficial effect in a sulfur production plant and conversely demands larger expenditures for equipment and energy, selective scrubbing of hydrogen sulfide is employed on a large scale to separate $H_2S$ from $CO_2$ in the sour gas scrubbing system. In such methods, when the scrubbing agent is regenerated, there is obtained, in addition to a gas stream rich in hydrogen sulfide and containing only part of the separated carbon dioxide, also a residual gas stream containing carbon dioxide and essentially free of hydrogen sulfide. This residual gas stream can be either directly discharged into the atmosphere, or if desired, pure carbon dioxide may also be recovered and used for conventional purposes.

RECYCLE OF HYDROGENATED SULFUR PLANT TAIL GAS TO SOUR GAS SCRUBBING SYSTEM

CROSS-REFERENCE TO RELATED APPLICATION

This invention is related to the invention described and claimed in an application entitled SCRUBBING SYSTEM YIELDING HIGH CONCENTRATION OF HYDROGEN SULFIDE by Gerhard Ranke and Horst Weiss, owned by a common assignee of the present application and being concurrently filed on Dec. 8, 1981, bearing Ser. No. 328,553. The contents of this related application are incorporated herein.

BACKGROUND OF THE INVENTION

This invention relates to a gas absorption system for purifying a gas flow contaminated at least by carbon dioxide and hydrogen sulfide, utilizing a sour gas scrubbing agent selective for hydrogen sulfide, from which an off-gas enriched in hydrogen sulfide is removed and fed fo a sulfur recovery means.

A process step frequently required in the processing of raw gas streams is the separation of sour gases which are understood to encompass essentially carbon dioxide, hydrogen sulfide, carbonyl sulfide, hydrocyanic acid, and mercaptans. For one or more reasons, e.g., corrosion or catalyst poisoning, such acidic compounds must be removed prior to downstream treatment of the residual gaseous components. Most frequently found and generally in the highest concentrations of the raw gas streams are carbon dioxide and hydrogen sulfide.

Examples of such raw gas streams include, but are not limited to, natural gas, cracked gases, and especially hydrogen-containing gaseous mixtures. To produce industrially useful hydrogen-rich gaseous mixtures, for example, feed gas for hydrogenations, ammonia synthesis, methanol synthesis, etc., conventional starting materials at the present time are crude oils, refinery residue oils, coal, natural gas or similar carbon-containing substances. These raw materials, which in most cases contain sulfur, are subjected to oxidative thermal cracking with oxygen (reforming) at an elevated temperature. After the separation of entrained solids and liquids, e.g., soot, tar, naphthalenes, higher hydrocarbons, and water, a gaseous mixture is obtained consisting essentially of hydrogen, carbon oxides, and hydrogen sulfide, with possible traces of nitrogen, argon, methane and other impurities. If it is intended to use this gas for oxo synthesis, the sour gases are immediately removed so as to provide a synthesis gas consisting essentially of carbon monoxide and hydrogen. In contrast, if it is intended to obtain a gas consisting essentially only of hydrogen, for example hydrogenation hydrogen, or a feed gas mixture for ammonia synthesis, then the carbon monoxide contained in the gas is subjected to a water-gas shift conversion, resulting in oxidation of carbon monoxide to carbon dioxide and in the formation of additional hydrogen. In such a shift conversion, any mercaptans and any carbonyl sulfide which may be contained in the raw gas are reduced to hydrogen sulfide so that the sour gas to be removed from these gases consists essentially of only carbon dioxide and hydrogen sulfide.

Conventionally, the off-gas from the sour gas removal system comprises $CO_2$ and $H_2S$. Whereas $CO_2$ is ecologically acceptable except for the controversial greenhouse effect, the $H_2S$, owing to its high toxicity, cannot be exhausted into the environment except in exceedingly low legally acceptable concentrations. Consequently, $H_2S$ is generally converted into elementary sulfur in a sulfur producing plant, e.g., a Claus plant.

Both chemical and physical scrubbing methods have been developed for the selective separation procedure. For many years now, the physical scrubbing methods have been preferred for large scale usage, especially to purify a gas stream relatively strongly contaminated with carbon dioxide. The physical absorption or scrubbing liquids are used therein to dissolve the sour gas components without simultaneous chemical reaction and can be liberated to these components by expansion, heating and/or distillation. For the separation of carbon dioxide and hydrogen sulfide, in particular, it has been found suitable to use polar organic solvents, especially methanol which is capable of dissolving large amounts of sour gas below 0° C.

The off-gas fraction enriched with hydrogen sulfide to an extent dependent on the hydrogen sulfide content of the raw gas to be purified ordinarily contains between 10 and 70% by mole of hydrogen sulfide and is processed for instance in a sulfur recovery plant based on the Claus-reaction principle into elementary sulfur. This generally requires that part of the hydrogen sulfide be oxidized into sulfur dioxide in order to generate a suitable reaction gas for the Claus reaction,

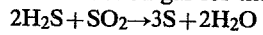

A process of this type is described for instance in HYDROCARBON PROCESSING, April 1973, p. 107.

The sulfur recovery based on the Claus reaction suffers from the drawback that the conversion into elementary sulfur is not complete; rather a tail gas is obtained which always contains sulfur compounds, in particular hydrogen sulfide and sulfur dioxide. Even though most of sulfur compounds separated from the gas stream will be converted into elementary sulfur in a sulfur recovery based on the Claus reaction, the sulfur compounds contained in the tail gas still remain at least occasionally, in a concentration prohibiting discharge into the atmosphere. Accordingly, to further purify this tail gas, many methods have been developed which, however, suffer from the drawback of high capital costs. Such methods are described, for instance, in HYDROCARBON PROCESSING, April 1973, pp. 111-116.

SUMMARY OF THE INVENTION

An object of this invention is to provide a system in relation to the above described conventional system wherein the discharge of sulfur compounds from the tail gas of a sulfur recovery plant into the atmosphere can be prevented in a relatively economical manner.

Upon further study of the specification and appended claims, further objects and advantages of the present invention will become apparent to those skilled in the art.

To attain these objects, the tail gas obtained during the sulfur recovery and which contains at least carbon dioxide and sulfur compounds is subjected to hydrogenation, and is then recycled to the sour gas scrubbing system.

The invention therefore provides a process which simplifies the expenditure in equipment and makes possible a practically complete recovery of the sulfur in elementary form. Compared with the conventional process steps in purifying the tail gas, for instance additional non-specific scrubbing steps such as amine scrubbing and/or catalytic or adsorptive methods and/or thermal or catalytic after-burning equipment, the process of the invention merely requires a hydrogenation stage. The tail gas obtained in addition to liquid sulfur in the sulfur recovery plant essentially contains hydrogen sulfide, sulfur dioxide and carbon dioxide. Hydrogenation is required before this exhaust gas is recycled to the sour gas scrubbing system; otherwise problems, caused primarily by $SO_2$ would occur in the selectivity required in the system. After the sulfur dioxide has been converted into hydrogen sulfide in the course of the hydrogenation, the gas recycled to the sour gas scrubbing system is subjected to selective scrubbing to provide an enriched $H_2S$ off-gas. While the hydrogen sulfide and a small part of the carbon dioxide in the hydrogenated tail gas are again fed (together with the off-gas derived from the scrubbing of the raw gas) to the sulfur recovery stage, the gaseous "dead-weight" comprising mainly carbon dioxide is discharged as a sulfur-free fraction together with the carbon dioxide separated during the sour gas scrubbing.

Because in the process of the invention, the tail gases containing sulfur compounds that are produced in the sulfur recovery are recycled into the process and are not discharged from the plant, another advantage of the process of the invention resides in the fact that the sulfur recovery stage need not be designed for maximum sulfur yields in a single pass. Whereas many modern plants based on the Claus reaction are expensively designed for yields in excess, for instance, of 99%, a sulfur yield of about 85 to 97%, especially about 91 to 95%, in the process of the invention—as feasible in two-stage or three-stage Claus equipment—provides good results. The design of the sulfur recovery for such lowered yields in the single flow-through process results in a substantial lowering of the costs of the sulfur recovery equipment compared to known methods. While more tail gas is generated if the sulfur yield is less and thereby a certain increased size of the equipment components is required into which the tail gas is recycled, the associated increase in expenditure is more than counterbalanced by the savings obtained in the cost of the sulfur recovery equipment. The optimum sulfur yield depends on the particular case, and the amount of the recycle-produced depends on the particular process conditions and the kind of sour gas scrubbing system selected.

The tail gas produced in the sulfur recovery stage ordinarily will be present at a relatively low pressure, for instance between 1.5 and 5 bars. As the raw gas stream to be purified in the sour gas scrubbing stage typically is produced at a higher pressure, compression is required to recycle the hydrogenated tail gas.

The recycle of the hydrogenated tail gas need not mandatorily result in its being mixed with the raw gas stream to be purified. Rather, in many instances, a recycle into a regeneration section of the sour gas scrubbing system is feasible. This is possible, for instance, in case the sour gas scrubbing system is conducted with a physical scrubbing agent having different solubilities for hydrogen sulfide and carbon dioxide, e.g., methanol. In such a scrubbing procedure, the sour gas scrubbing system typically comprises a regenerating section with a hydrogen-sulfide enrichment stage where as gas phase enriched in carbon dioxide and free of hydrogen sulfide is separated from the loaded scrubbing agent. The scrubbing agent is partly regenerated with respect to the carbon dioxide but still contains all of the scrubbed out hydrogen sulfide. Then, in an ensuing regeneration, all the scrubbed out components are volatilized from the scrubbing agent. When using such a scrubbing procedure, it will be advantageous in another preferred embodiment of the process of the invention to introduce the hydrogenated tail gas into the $H_2S$ enrichment stage and to separate therein most of the carbon dioxide. Compared to the step of recycling the hydrogenated tail gas into the raw gas stream to be purified, this latter procedure offers the advantage that such a hydrogen-sulfide enrichment stage is generally operated at a substantially lower pressure than the scrubbing stage of the raw gas, whereby a substantial reduction in the energy consumption required for the compression of the hydrogenated tail gas is realized. Furthermore, if the hydrogenated exhaust gas were recycled to the raw stream to be purified, the demands on the scrubbing column would thereby be increased—and substantially needlessly, as most of the hydrogenated tail gas does not require scrubbing.

In the physical scrubbing step already described, loaded scrubbing agents withdrawn at high pressure from the scrubbing system are substantially decompressed before being fed into the hydrogen-sulfide enrichment stage. The more volatile components dissolved in the scrubbing agents thereby escape. When purifying a hydrogen containing gas stream, a gas phase rich in hydrogen will then be formed, which ordinarily following a new compression is recycled into the gas stream and is introduced again into the scrubbing stage. In a further preferred embodiment of the invention, a partial stream of the hydrogen-containing gas phase obtained from the expansion is then tapped off and used as the hydrogenation gas to hydrogenate the tail gas of the sulfur recovery plant. Alternatively, part of the purified raw purified gas leaving the top of the scrubbing column can be used for the hydrogenation.

As previously discussed, a carbon-monoxide shift conversion is frequently employed for generating gas streams rich in hydrogen. In such cases, it is advatageous to mix the sulfur-recovery tail gas to be hydrogenated directly with the gas stream which is to be fed to the carbon-monoxide shift conversion. In effect, the tail gas is thus passed through the shift reaction zone, and as the shift conversion takes place under conditions wherein the tail gas is also hydrogenated, an additional hydrogenation stage can be decreased in size or even eliminated in such cases.

Besides recycling to a carbon-monoxide shift conversion, recycling into other reaction stages is possible wherein the tail gas is hydrogenated. For instance it is possible to recycle into a carbon or oil gasification stage provided such as process step is provided for the generation of the gas stream which must be purified.

BRIEF DESCRIPTION OF THE DRAWINGS

Further details of the invention are discussed below in relation to the drawings, wherein.

DETAILED DESCRIPTION OF THE DRAWINGS

Figure 1:
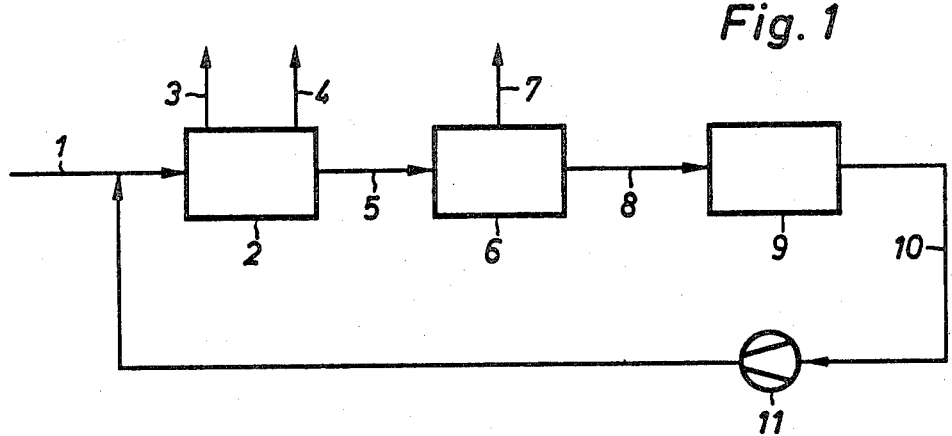
FIG. 1 is essentially a simple block diagram illustrating the process of the invention.
Figure 3:
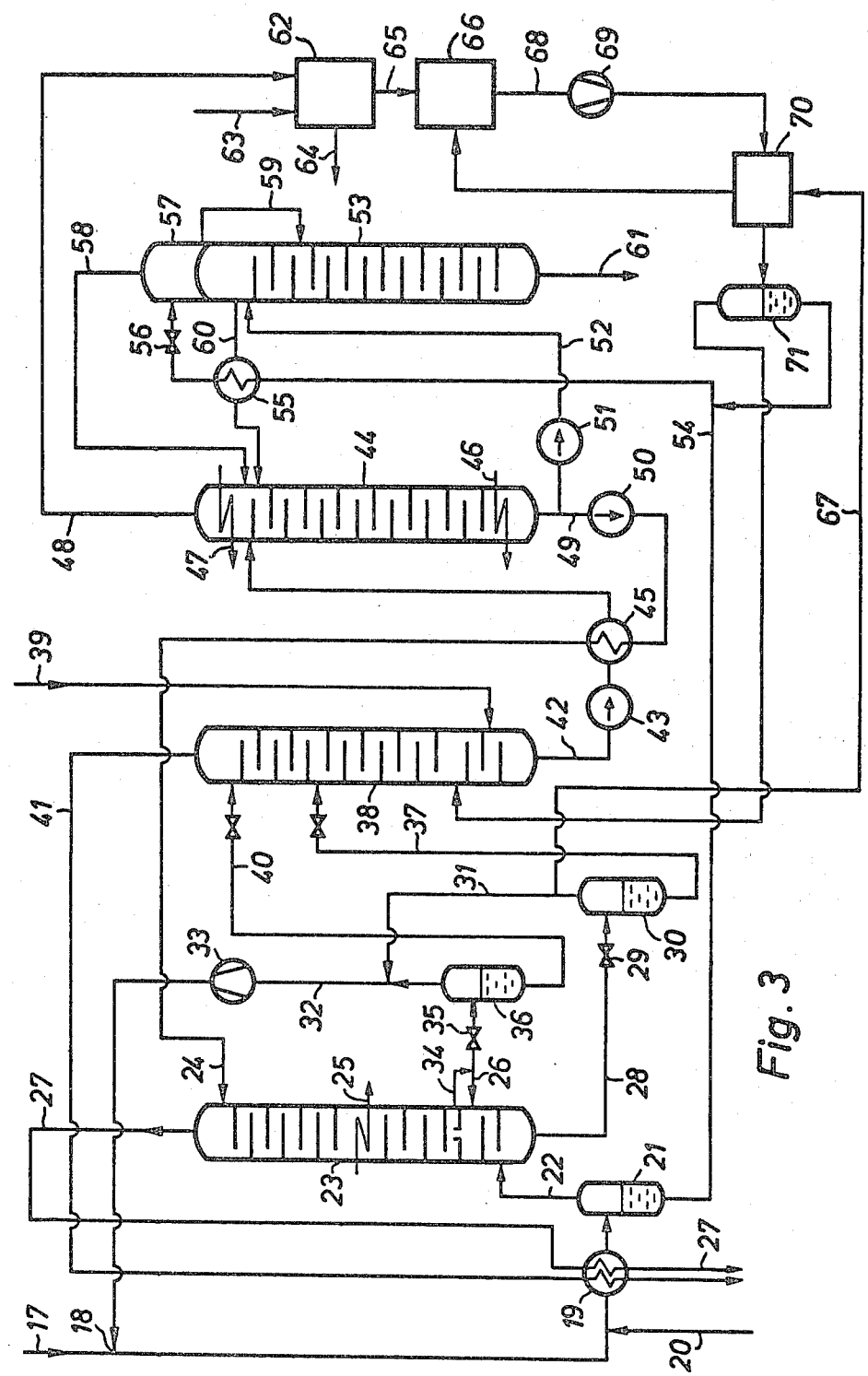
FIG. 3 is a preferred embodiment of the process of the invention, utilizing a physical scrubbing agent.

As shown in FIG. 1, the gas stream to be purified passes through the line 1 into a sour gas scrubbing system 2 (comprising a scrubbing column, a hydrogen sulfide enrichment column and a regeneration column, the operation of which is explained in the description of FIG. 3) wherein especially carbon dioxide and hydrogen sulfide are separated from the gas flow. The purified gas leaves the sour gas scrubbing system through line 3. The selective sour gas scrubbing can be carried out both with a physical as well as a chemical scrubbing liquid and forms two flows of exhaust gases of different compositions. The off-gas removed through the line 4 at most contains a few ppm of sulfur compounds and consists essentially of the carbon dioxide removed from the gas flow. When the scrubbing agent is regenerated by means of a stripping gas, there also may be appreciable amounts of this stripping gas in this flow of off-gas.

The flow of off-gas evacuated from the sour gas scrubbing system 2 through the line 5 contains the scrubbed out sulfur compounds and also more or less of other components, for instance part of the scrubbed out carbon dioxide or of the stripping gases used in the regeneration. This gas stream is processed into elementary sulfur in a sulfur recovery plant 6 operating on the Claus principle. Formed liquid sulfur is removed through the line 7. A tail gas produced during the sulfur recovery and containing for the most part carbon dioxide but also containing such sulfur compounds as sulfur dioxide and hydrogen sulfide is passed through a line 8 into a hydrogenation stage 9. In this latter process stage, it is especially the sulfur dioxide contained in the tail gas passing through the line 8 which is catalytically converted. The hydrogenated tail gas is evacuated through the line 10 and after being compressed in the compressor 11 is recycled into the raw gas flow 1. In this manner all the sulfurous tail gases emanating from the sulfur recovery plant 6 re-enter the sour gas scrubbing system 2, whereby practically no sulfur compounds at all are discharged into the environment.

Figure 2:
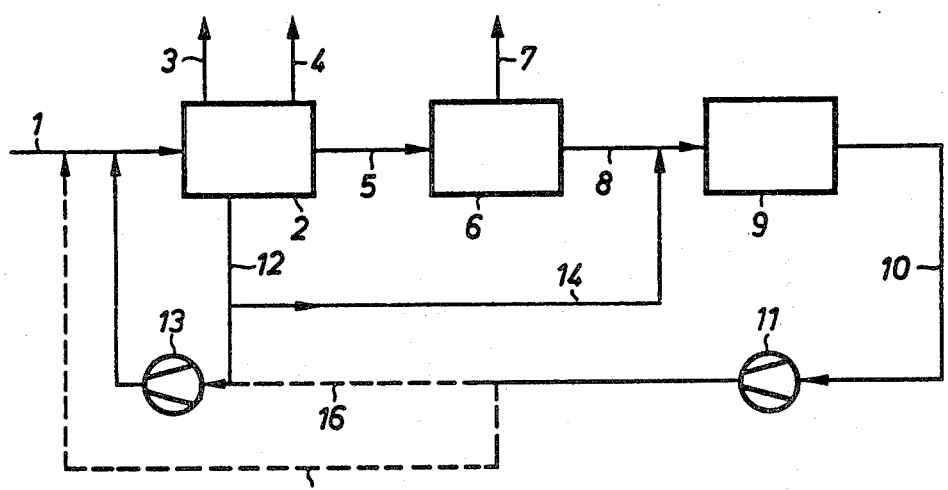
FIG. 2 is a more detailed block diagram.

The process diagram shown in FIG. 2 has the same numbered elements as in FIG. 1, and provides several modifications or variations regarding the just described simplest procedure above. In many instances, the regeneration of a loaded scrubbing agent is accompanied by an expansion resulting in a degassing of valuable components desired to be included in the purified crude gas stream. Therefore the degassed fraction is ordinarily evacuated through a line 12 and after compression in a compressor 13 to the pressure of the gas flow to be purified is recycled into latter. In the purification of hydrogen containing gas streams, this fraction always contains a relatively high proportion of hydrogen, so that appropriately a partial stream will be evacuated through a line 14 and introduced as the hydrogenating gas into the hydrogenation stage 9.

The recycle of the hydrogenated tail gas removed through the line 10 can be implemented in a variety of ways. The tail gas either can be directly compressed in the compressor 11 to the pressure of the gas flow 1 to be purified, as in FIG. 1, and be returned into this gas stream 1, as indicated by the dashed-line conduit 15, or for a corresponding design of the compressor 13, the compressor 11 need only raise the pressure to that at the suction side of the compressor 13 where thereupon there will be a common compression of the hydrogenated tail gas and of the gas stream evacuated from the sour gas scrubbing system through the line 12. This variation is indicated by the dashed-line conduit 16.

In the preferred comprehensive embodiment shown in FIG. 3, a crude gas rich in hydrogen, for instance a crude gas obtained from partial oxidation and subsequent carbon-monoxide shift conversion, is introduced through line 17 and after being mixed with a recycle gas is fed into a heat exchanger 19 where it is cooled to a low temperature, for instance between $-20°$ and $-40°$ C. Prior to cooling the gas stream, a small amount of methanol is injected through the line 20 to prevent ice formation due to water vapor in the gas stream during said cooling. The cooled gas is separated in a phase separator 21 from the condensate formed during cooling, this condensate being essentially the water and the heavier hydrocarbons contained in the crude gas. Thereupon, the cooled gas stream passes through the line 22 into the lower section of a scrubbing tower 23. In this preferred embodiment, the gas is scrubbed in a scrubbing tower 23 having two different sections. Regenerated, pure methanol is introduced as the scrubbing agent through the line 24 into the top of the scrubbing tower. Thereby a high purification of the gas occurs in the upper section of the scrubbing tower, as a result of which the last traces of sour gases are dissolved in the methanol. The methanol trickling down countercurrently to the ascending stream absorbs the major part of the carbon dioxide contained in this gas stream. To remove the large heat of solution developed thereby, the methanol is cooled by a coolant in a cooling stage 25. A partial stream 26 of this methanol preloaded with carbon dioxide is passed into the lower section of the scrubbing tower 23 where it removes the hydrogen sulfide contained in the crude gas. As the methanol is only slightly heated by the scrubbing of the hydrogen sulfide and of any carbonyl sulfide contained in the gas stream, no cooling is required in this stage.

The flow of crude gas freed on its flow path through the scrubbing tower 23 first of hydrogen sulfide and then of carbon dioxide is evacuated from the top of the scrubbing tower 23 through the line 27 and after being heated in the heat exchanger 19 by the unpurified gas stream to be cooled is removed as purified hydrogen from the sour gas scrubbing system.

Methanol loaded with carbon dioxide collects together with hydrogen sulfide in the sump of the scrubbing tower 23; this methanol following withdrawal through line 28 and expansion in the valve 29 is fed into phase separator 30. The resultant gas phase containing hydrogen is passed through conduits 31 and 32 into the compressor 33 where it is recompressed to the pressure of the gas stream to be purified; after removal of the heat of compression in an after-cooling means, said gas phase is mixed into the flow of crude gas at 18.

In a corresponding manner the methanol loaded with carbon dioxide and evacuated through the line 34 and located above the sump section of the scrubbing tower 23 is expanded in the valve 35 and separated from the evolved gases in the phase separator 36. The gas phase is passed through line 32 and together with the gas fraction from the separator is recycled into the crude gas.

The methanol loaded with hydrogen sulfide and carbon dioxide that accumulates in the separator 30 is fed through a line 37 into the center section of a hydrogen-sulfide enrichment column 38. Part of the carbon dioxide dissolved in the methanol is separated by stripping with nitrogen in this column. For that purpose the nitrogen is fed through the line 39 into the lower section of the hydrogen-sulfide enrichment column. To prevent hydrogen sulfide from escaping at the top of the hydrogen-sulfide enrichment column, carbon-dioxide loaded methanol from the separator 36 is introduced through the line 40 at the top of the column 38. This incompletely saturated methanol acts as a scrubbing agent for the stripped-out hydrogen sulfide, whereby a sulfur-free stream of gas is removed from the column 38 through the line 41, this stream consisting essentially of only carbon dioxide and nitrogen and being suitable for discharge into the environment after being heated by the gas stream to be purified in the heat exchanger 19.

Methanol containing all of the hydrogen sulfide separated from the gas flow and possibly also the carbonyl sulfide in this gas stream and part of the scrubbed carbon dioxide collects in the sump of the hydrogen-sulfide enrichment column 38. This methanol is discharged through the line 42, conveyed by a pump 43 into a downstream regenerating column 44, and just before being fed into the regeneration column is heated in the heat exchanger 45 by regenerated methanol being cooled.

In the regeneration column, those components still dissolved in the methanol are expelled by means of methanol vapor. A stream-operated heater 46 is provided in the lower section of the regeneration column 44 to generate the methanol vapor. The methanol vapors are condensed again at the top of the column by a condenser 47, so that only the components freed from the methanol are removed through the line 48. Purified methanol accumulating in the sump of the regeneration column is removed through the line 49 and conveyed by the pump 50 first through the heat exchanger 45 and then into the line 24 where it is again fed to the scrubbing tower 23. A partial stream of the regenerated methanol is made to pass through the pump 51 and through the line 52 into another separation column 53 wherein water still contained in the regenerated methanol is separated. The condensate from the gas flow to be purified and separated in the phase separator 21 is also fed into this separation column 53. For that purpose, the condensate is moved through the line 54, heated by means of methanol in the heat exchanger 55 and expanded in the throttle valve 56 to the pressure of the water separation column 53. The decompressed condensate is introduced into the upper section 57 of the column 53 acting as the separator. Components degassed during the expansion are removed through the line 58 and fed into the regeneration column 44. The remaining condensate passes through the line 59 into the column 53. The methanol freed from water is withdrawn through the line 60 and after being cooled in the heat exchanger 55, is fed into the upper section of the regeneration column 44. The separated water is removed from the sump of the separation column 53 through the line 61.

The fraction removed from the top of the regeneration column 44 through the line 48 contains the hydrogen sulfide separated from the gas stream as well as part of the separated carbon dioxide. This fraction is fed into the sulfur recovery plant 62 operating on the Claus reaction. The sulfur dioxide required for the Claus reaction is generated by the introduction through line 63 of an $O_2$-containing gas flow for the partial combustion of the hydrogen sulfide. The combustion is advantageously carried out with pure oxygen, as combustion using air would introduce a substantial dead weight of gas in the form of nitrogen into the equipment. Elementary sulfur generated in the sulfur recovery plant is removed through the line 64 in liquid form, whereas a flow of tail gas essentially consisting of carbon dioxide, hydrogen sulfide and sulfur dioxide passes through the line 65. This latter exhaust gas is hydrogenated in a subsequent hydrogenation stage 66. The hydrogen required for the hydrogenation is introduced through the line 67 and represents a partial flow of the hydrogen-containing gas evacuated from the phase separator 30 through the line 31. The hydrogenation stage 66 for the tail gas from the sulfur recovery 62 comprises a conventional catalytic reactor having a conventional hydrogenation catalyst and optionally provided with heat exchangers to achieve the required temperature of reaction and to cool product gas after the hydrogenation. Those hydrogenation procedures are especially advantageous which operate approximately at the temperature of tail gas being passed through the line 65. The temperature of the tail gas from a Claus facility ordinarily is about 150° C. The preferred hydrogenation catalyst is a catalyst which comprises a metal or a mixture of metals with hydrogenation activity on a support, for instance Co and/or Mo on an alumina support.

The hydrogenated tail gas is fed through the line 68 into a compressor 69 which compresses it to the pressure of the hydrogen-sulfide enrichment column 38. After compression, the heat of compression is removed in heat exchanger 70 and the water formed during hydrogenation is removed in phase separator 71. The dewatered hydrogenated tail gas is then fed into the lower section of the hydrogen-sulfide enrichment stage 38. The proportion of the hydrogenation tail gas containing carbon dioxide and possibly other inert gases such as nitrogen flows through the column 38 and is withdrawn at the top through the line 41. Conversely, the sulfur compounds contained in the hydrogenated tail gas (almost solely of hydrogen sulfide) are scrubbed in the tower 38 by means of a countercurrent stream of partially saturated methanol. The $H_2S$-containing methanol in the sump of the tower 38 is passed to the column 44 where the $H_2S$ is recovered and is again fed back to the sulfur recovery plant 62.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

As shown in FIG. 3, a gas stream produced from a partial oxidation and shift conversion of carbon monoxide containing 64.3 molar % of hydrogen, 2.8 molar % of inert gases (nitrogen, carbon monoxide, argon, methane), 32.3 molar % of carbon dioxide, 0.65 molar % of hydrogen sulfide and 7.7 ppm of carbonyl sulfide was purified. This gas stream is introduced through line 17 at a temperature of 36° C. and at a pressure of 75.6 bars. Through the line 27 is withdrawn purified hydrogen in a molar concentration of about 98% contaminated merely by about 2 molar % of inert gases and 100 ppm of carbon dioxide. In the regeneration of the loaded methanol, there is withdrawn via conduit 48 a hydrogen sulfide fraction containing 34.9 molar % of hydrogen sulfide, 62.7 molar % of carbon dioxide and 0.03 molar % of carbonyl sulfide, the residual portion being of nitrogen and a very slight amount of hydrogen. At a temperature of 25° C. and at a pressure of about 1.5 bars, the gas is fed into a Claus plant for the purpose of converting sulfur values into elementary sulfur. A tail gas from the Claus plant 62 passes through the line 65, containing 93.9 molar % of carbon dioxide and 3.4 molar % of nitrogen. This gas is further contaminated with sulfur compounds, namely with 1.8 molar % of hydrogen sulfide and 0.9 molar % of sulfur dioxide. Therefore it is reacted with a hydrogenating gas of 61.8 molar % of hydrogen, 5.5 molar % of inert gases, 32.4 molar % of carbon dioxide, 0.3 molar % of hydrogen sulfide and 3 ppm of carbonyl sulfide in the hydrogenation stage 66. The quantity of the hydrogenating gas is about 5% by volume of the gas stream to be hydrogenated. The Claus tail gas is passed at a temperature of about 150° C. through the hydrogenation stage and finally arrives in the conduit 68 with a composition of 0.3 molar % hydrogen, 3.7 molar % of inert gases, 93.4 molar % of carbon dioxide and 2.6 molar % of hydrogen sulfide, and then is recycled into the hydrogen sulfide enrichment stage 38. In this example, use was made of a three-stage Claus plant with a sulfur yield of 95%.

EXAMPLE 2

In this example, the sulfur recovery was conducted using a two-stage Claus plant with a yield of 85%. This resulted in a quantity of exhaust gas from the Claus equipment higher by about 18% and containing 3.3 molar % of nitrogen, 89.2 molar % of carbon dioxide, 5.0 molar % of hydrogen sulfide and 2.5 molar % of sulfur dioxide. This tail gas is reacted with an amount of hydrogenating gas which is about 13% of the volume of the tail gas, whereby there is obtained a recycle gas containing 0.7 molar % of hydrogen, 3.8 molar % of inert gases, 88.4 molar % of carbon dioxide and 7.1 molar % of hydrogen sulfide.

The hydrogenated tail gas recycled into the scrubbing system constitutes an amount in the first example of about 1.3% and in the second example of about 1.5% of the gas stream to be purified.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of at least carbon dioxide and hydrogen sulfide from a raw gaseous mixture to form a purified gaseous mixture comprising passing said gas through a sour gas removal system including the steps of scrubbing said gaseous mixture with a physical liquid scrubbing agent having a higher absorbability for hydrogen sulfide than for carbon dioxide, removing from said system an off-gas enriched in hydrogen sulfide, and passing said off-gas to a sulfur recovery system comprising the conversion of sulfur values to elemental sulfur and the recovery of a tail gas containing hydrogen sulfide and sulfur dioxide, the improvement which comprises hydrogenating said tail gas to convert sulfur dioxide to hydrogen sulfide and recycling resultant hydrogenated tail gas to said sour gas removal system, said sour gas removal system comprising in series a scrubbing column, a hydrogen-sulfide enrichment column, and a regeneration column, said resultant hydrogenated tail gas being recycled into the hydrogen-sulfide enrichment column, whereby essentially no hydrogen sulfide or sulfur dioxide is discharged into the environment.

2. A process according to claim 1, wherein the physical scrubbing agent having a higher absorbability for hydrogen sulfide than for carbon dioxide is methanol.

3. A process according to claim 1, said raw gaseous mixture further comprising hydrogen, and further comprising the steps of withdrawing loaded scrubbing agent from the scrubbing column of the sour gas removal system, expanding said loaded scrubbing agent to a lower pressure, separating a liquid phase and a hydrogen-containing gas phase from said expanded loaded scrubbing agent, and employing said gas phase at least in part for said hydrogenating of said tail gas.

4. A process according to claim 3, further comprising passing said liquid phase to the hydrogen-sulfide enrichment column.

5. A process according to claim 3, wherein the physical scrubbing agent having a higher absorbability for hydrogen sulfide than for carbon dioxide is methanol.

6. A process according to claim 4, wherein the physical scrubbing agent having a higher absorbability for hydrogen sulfide than for carbon dioxide is methanol.

7. A process according to claim 1, further comprising introducing a gaseous nitrogen stream into the bottom of the hydrogen-sulfide enrichment column to strip out $CO_2$ from the physical scrubbing agent.

8. A process according to claim 3, further comprising introducing a gaseous nitrogen stream into the bottom of the hydrogen-sulfide enrichment column to strip out $CO_2$ from the physical scrubbing agent.

9. A process according to claim 8, further comprising passing said liquid phase to the hydrogen-sulfide enrichment stage.

10. A process according to claim 9, wherein the physical scrubbing agent having a higher absorbability for hydrogen sulfide than for carbon dioxide is methanol.

11. A process according to claim 1, wherein the conversion to sulfur is about 85 to 97%.

12. A process according to claim 10, wherein the conversion to sulfur is about 91 to 95%.

* * * * *